United States Patent Office 3,312,260
Patented Apr. 4, 1967

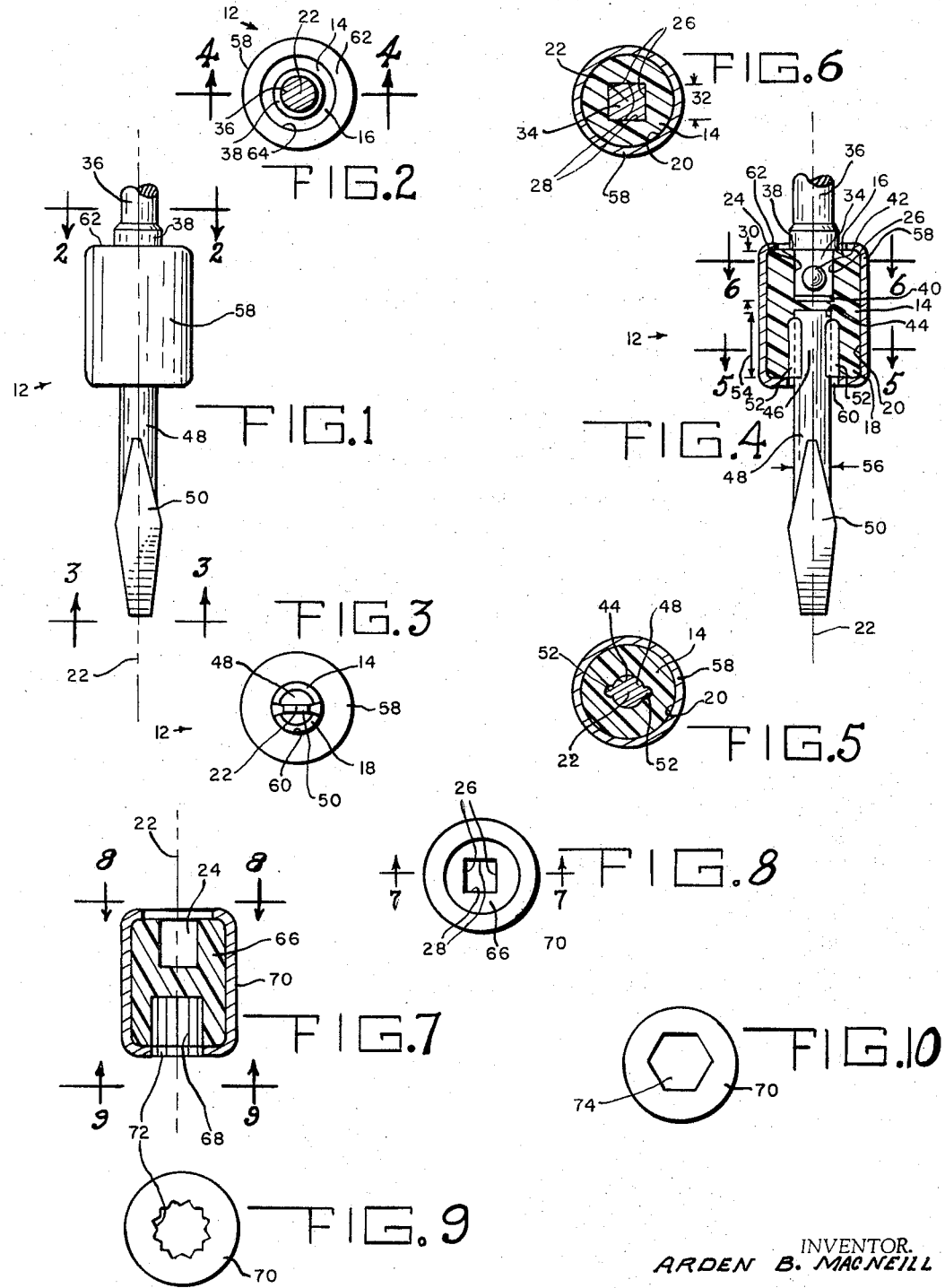

3,312,260
SOCKET TYPE ADAPTER FOR TORQUE-TRANSMITTING TOOLS
Arden B. MacNeill, 63 Riverview Ave.,
Waltham, Mass. 02154
Filed Apr. 2, 1965, Ser. No. 444,957
6 Claims. (Cl. 145—50)

This invention relates to interchangeable socket attachments for torque transmitting hand tools of the type having a stem with a torque transmitting male adapter on a common axis, and more particularly to an attachment with a plastic body in a thin metal housing and having a socket receptacle adapted for operatively receiving the male adapter and carrying in opposite relation to the socket receptacle, symmetrically about the axis, a work gripping formation for the transmission of torque from the stem to the work.

The high cost of hand tools is a problem particularly to the home handyman whose work projects involve an infrequent need of any particular tool and a wide variety of different tools for effective performance of such projects. This problem is minimized by the present invention of interchangeable socket tool attachments which also incorporate other desirable features and advantages. Among these other desirable features and advantages is the provision of interchangeable socket attachments which are particularly suitable for use with the hand tool disclosed in my application for patent, No. 435,605, entitled, Ratchet Screwdriver Type Hand Tool, as well as with conventional socket type hand tools. Other desirable features and advantages include the provision of a configuration which combines metal and plastic components in a combination which not only achieves an extremely inexpensive construction, but also achieves a desirable long tool life and wear resistance characteristic.

A primary object of the present invention is the provision, for torque transmitting hand tools, of interchangeable socket attachments which are very inexpensive to manufacture.

Other objects include the provision, for torque transmitting hand tools, of interchangeable socket attachments having capacity for fastening and unfastening screws, nuts, bolts and the like, and which are of combined plastic and metal construction in manner to achieve both economy in manufacture and desirable strength and wear characteristics in use.

And a further object is the provision, for a torque transmitting hand tool, of a socket screwdriver attachment of combined metal and plastic construction particularly suited to achieving economy in manufacture and desirable strength for effective tool torque transmission to the screw.

These objects, features and advantages are achieved generally by providing a socket tool attachment for a torque transmitting hand tool of the type having a stem rotatable about a longitudinal axis and a male adapter at one end of the stem, the socket attachment including the combination of a plastic body having two ends and a circular cross section with the center of the circle coinciding with the longitudinal axis when the socket attachment is in place on the stem, a socket receptacle in one of the ends symmetrical about the longitudinal axis for slidably receiving the male adapter, a structural arrangement in the other end of the plastic body arranged symmetrically about the longitudinal axis and having a configuration for gripping a work piece with capacity for transmitting a torque from the stem to the work piece, and a thin metal housing tightly surrounding the plastic body for effecting additional strength to the structure.

By making the socket receptacle with a cross sectional shape in the form of a square, adaptability to conventional socket wrench tools is thereby achieved.

By making the structural arrangement for gripping the work piece in the form of a second socket with a plurality of sides parallel to the longitudinal axis and a cross sectional shape to fit the peripheral shape of the work piece, a very inexpensive socket wrench attachment is thereby achieved.

By providing the thin metal housing with an opening at the work piece gripping socket coincident in cross sectional shape with that of the work piece socket, long life and wear resistance to repetitive use is thereby achieved.

By making the structural arrangement in the form of a rod having two ends and a longitudinal axis coincident with the stem axis and with one of the rod ends having a screwdriver formation extending longitudinally therefrom and the other rod end having radially disposed bosses with the rod and bosses firmly imbedded in the plastic body, a strong, effective and very inexpensive socket screwdriver attachment is thereby achieved.

These and other features, objects and advantages will be better understood from the following description taken in connection with the accompanying drawings of preferred embodiments of the invention and wherein:

FIG. 1 is a side elevation of a socket screwdriver attachment in accordance with the present invention operatively carried on a male adapter at the end of a torque transmitting hand tool stem or shaft, only a portion of which is shown in the drawing;

FIG. 2 is a top view taken on line 2—2 of FIG. 1;

FIG. 3 is a bottom view taken on line 3—3 of FIG. 1;

FIG. 4 is a cross sectional view taken on line 4—4 of FIG. 2 to more clearly show construction;

FIG. 5 is a cross sectional view taken on line 5—5 of FIG. 4;

FIG. 6 is a cross sectional view taken on line 6—6 of FIG. 4;

FIG. 7 is a cross sectional view taken on line 7—7 of FIG. 8 illustrating a second embodiment of the invention;

FIG. 8 is a top view of the FIG. 7 embodiment taken on line 8—8 of FIG. 7;

FIG. 9 is a bottom view of the FIG. 7 embodiment taken on line 9—9 of FIG. 7;

FIG. 10 is a bottom view taken on line 9—9 of FIG. 7 illustrating an alternative construction of the FIG. 7 embodiment.

Referring to FIGS. 1 through 5 of the drawings in more detail, a preferred embodiment of a socket screwdriver attachment in accordance with the present invention is designated generally by the numeral 12. The socket screwdriver attachment 12 has a molded plastic body 14 of such strong plastic material as cellulose acetate and for particularly heavy use conditions preferably of such strong and creep resistant plastic material composition as fiberglass and nylon. The plastic body 14 has an upper end 16 and a lower end 18 which may be flat and parallel to each other. The body 14 may have a circular peripheral configuration 20 with the circle center coinciding with longitudinal axis 22 through the body 14.

The upper end 16 of the body 14 has a receptacle or cavity 24 extending downwardly along the longitudinal axis 22 and formed by parallel walls 26 and 28 symmetrically placed about the longitudinal axis 22 defining a socket preferably of square cross sectional shape as shown in FIG. 6. The socket 24 preferably has a depth 30 (FIG. 4) greater than the width 32 (FIG. 6) of the sides 26 and 28 which are dimensioned to receive as a sliding fit a male adapter 34 at the end of a stem or shaft 36 of a torque transmitting tool such as, for example, is disclosed in my above mentioned application for patent, No. 435,-

605, or a conventional torque transmitting tool such as used in a conventional socket wrench set.

A shoulder 38 is provided at the top of the male adapter 34 to engage the upper end 16 of the body 14 to limit the penetration of the male adapter 34 into the socket 24, preferably leaving a small clearance 40 between the bottom of the socket 24 and the male adapter 34. A spring pressed ball 42 may be provided on a side of the male adapter 34 to yieldably press against a wall 26 or 28 of the socket 24 to hold the socket attachment 12 in place on the male adapter 34 with capacity for removal therefrom by hand alone.

The other end 18 of the plastic body 14 has an elongated screwdriver anchoring recess 44 (FIGS. 4 and 5) carrying tightly therein an upper end 46 of a rod 48 having a longitudinal axis coincident with the axis 22 and carrying at its other end a screwdriver formation such as a blade 50 for slotted screws, or a formation for Phillips or Allen head screws and the like. The upper end 46 of the rod 48 preferably has oppositely disposed bosses or ears 52, formed as by swedging, extending along the sides of the upper end 46 for providing torque transmitting capacity between the plastic body 14 and the rod 48. The depth 54 to which the end 46 of the rod 48 extends into the plastic body 14 is preferably greater than the diameter 56 of the rod 48.

A thin metal housing 58 is formed to tightly circumscribe the periphery of the plastic body 14 for tightly confining the plastic body 14 to the interior of the housing 58 and thereby effectively increasing the strength characteristics of the socket attachment 12 for its torque transmitting function. The housing 58 may be a conventional ferrule carrying an opening 60 at its bottom end for receiving the screwdriver blade 60 and rod 48 during assembly which may consist of the simple operation of supporting the hole 60 end and forcibly pushing the body 14 with its rod 48 longitudinally along the axis 22 into the ferrule 58. Thereafter, the upper end of the ferrule 58 is crimped or spun inwardly to form a shoulder 62 overlapping the upper end 16 of the plastic body 14 in manner leaving a clearance opening 64 about the shoulder 38 of the stem 36.

It will be noted that the three components namely the plastic body 14, screwdriver rod 48 and ferrule 58 are all of a configuration which involve relatively simple and inexpensive manufacturing operations of a mass production nature as distinguished from the relatively expensive operations necessary for the production of a comparable solid metal attachment such as disclosed in FIG. 5 of my above mentioned application for patent, No. 435,605.

In operation, the socket screwdriver attachment 12 is pushed by hand onto the male adapter 34 until the shoulder 38 engages the top surface 16 of the plastic body 14. Thereupon the socket attachment 12 becomes an integral part of the tool of which the tool shaft 36 is a part and is thereby in position for use in selectively applying a right or left hand torque about the axis 22 from the tool shaft 36 through the body 14, rod 48 and screwdriver blade 50 to a screw or other slotted member (not shown) engaged by the screwdriver blade 50.

Referring to FIGS. 7 through 9 in more detail, therein is shown an alternative embodiment of a socket attachment in accordance with the present invention. The FIG. 7 embodiment has a molded plastic body 66 which may be of the same material and configuration as the above described plastic body 14, except in that the lower end carries therein a socket or receptacle 68 which in the illustrative embodiment of FIGS. 7 and 9 is a 12 point socket suitable for hexagonal and square nuts, bolts and the like. The molded plastic body 66 has a thin metal housing 70 tightly fitting the periphery thereof and may be similar to the housing 58, except in that the bottom opening 72 is preferably of a cross sectional shape the same as the 12 point socket 68 and coincides therewith to provide a protective, long wearing shield which prevents premature nicking and undesirable rounding of the plastic edges at the mouth of the socket 68 from rough engagement with nut and bolt work pieces.

While a 12 cornered socket 68 is shown in the FIGS. 8 and 9 illustration, other desirable bolt and nut socket shapes may also be used, as for example, a hexagonal socket opening 74 shown in the FIG. 10 illustrative embodiment.

Here again, it will be noted that the thin metal housing may be a conventional, inexpensive ferrule assembled to the plastic body 66 in manner similar to that described in connection with the plastic body 14 and ferrule 58 above. Also, the molded plastic body 66 and housing 70 components and their assembly involve very simple high production operations which effect substantial savings over conventional all steel, single component socket construction.

In operation, the FIG. 7 embodiment may be attached to the male adapter 34 interchangeably with the socket screwdriver attachment 12 and in the same manner as that described above in connection with the socket attachment 12. Thereupon, the FIG. 7 embodiment becomes an integral part of the tool of which the stem 36 is a part for use in selectively applying a right or left hand torque from the tool shaft 36 through the plastic body 66 to a bolt or nut (not shown) held in the socket 68 or 74.

This invention is not limited to the exact details of construction herein described as equivalents will suggest themselves to those skilled in the art.

What is claimed is:

1. In a socket attachment for a torque transmitting tool of the type having a stem carrying a male adapter on a common longitudinal axis, the combination of a plastic body having two ends and a circular cross section with the center of the circle coinciding with said longitudinal axis when the socket attachment is in place on said adapter, a socket in one of said ends with sides symmetrically located about said axis for slidably receiving said male adapter, means in the other end of said plastic body having a configuration arranged symmetrically about said longitudinal axis for gripping a work piece with torque transmitting capacity thereto, and a thin metal housing tightly surrounding said plastic body for effecting increased strength of the structure.

2. The combination as in claim 1 wherein said socket has a cross sectional shape in the form of a square and said gripping means includes a steel rod with a longitudinal axis coincident with said stem axis and having two ends with one of said rod ends having a screwdriver formation extending therefrom along said axis, and the other of said rod ends having oppositely disposed longitudinally extending bosses tightly imbedded in said plastic body, whereby providing capacity for transmitting torque from said stem through said body to said screwdriver formation.

3. The combination as in claim 1 wherein said socket has a cross sectional shape in the form of a square and said gripping means is another socket with a plurality of sides parallel to said axis and symmetrically disposed about said axis.

4. The combination as in claim 3 wherein said thin metal housing at said other end has an opening with a cross sectional shape coinciding with the cross sectional shape of said other socket for thereby shielding the plastic edges of said other socket.

5. In a socket attachment for a torque transmitting tool of the type having a stem terminating in a male adapter with both the stem and adapter being on a common longitudinal axis and said male adapter having a noncircular peripheral configuration perpendicular to said axis, the combination of a plastic body having a body axis and two oppositely disposed ends on said body axis, a socket extending along said body axis into said plastic body with an opening at one of said ends and a peripheral configuration perpendicular to said body axis for slidably receiving said peripheral configuration of said male adapter whereby the longitudinal axis of the adapter coincides with said body axis, a steel rod with a rod axis coinciding with the body axis and having two rod ends with one of said rod ends including a screwdriver formation along said rod axis, the other of said rod ends having radially disposed torque transmitting formation which with said other rod end is rigidly embedded in the other end of said plastic body whereby providing capacity for transmitting torque about said coincident axes from said stem through said male adapter to said plastic body and thereby to said screwdriver formation, and a thin metal housing tightly surrounding said plastic body for effecting increased strength of the structure.

6. In a socket attachment for a torque transmitting tool of the type having a stem terminating in a male adapter with both the stem and adapter being on a common longitudinal axis and said male adapter having a noncircular peripheral configuration perpendicular to said axis, the combination of a plastic body having a body axis and two oppositely disposed ends on said body axis, a socket extending along said body axis into said plastic body with an opening at one of said ends and a peripheral configuration perpendicular to said body axis for slidably receiving said peripheral configuration of said male adapter whereby the longitudinal axis of the adapter coincides with said body axis, a second socket extending into said plastic body along said body axis from the other of said ends and having a plurality of sides parallel to said body axis, and a thin metal housing tightly surrounding said plastic body for effecting increased strength of the structure.

References Cited by the Examiner
UNITED STATES PATENTS

| | | | |
|---|---|---|---|
| 2,522,217 | 9/1950 | Fischer et al. | 145—50 |
| 2,712,765 | 7/1955 | Knight | 145—66 |
| 2,833,548 | 5/1958 | Clark | 145—50 |
| 3,119,423 | 1/1964 | Weick | 145—50 |

WILLIAM FELDMAN, *Primary Examiner.*

R. V. PARKER, *Assistant Examiner.*